United States Patent
Yu

(12)
(10) Patent No.: US 6,597,908 B1
(45) Date of Patent: Jul. 22, 2003

(54) METHOD AND SYSTEM FOR MONITORING TRAFFIC CARRIER PERFORMANCE IN A MOBILE COMMUNICATION SYSTEM

(75) Inventor: Bee Yun Yu, Morristown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/500,673

(22) Filed: Feb. 9, 2000

(51) Int. Cl.[7] .................................................. H04Q 7/20
(52) U.S. Cl. ........................ 455/424; 455/423; 455/509
(58) Field of Search ................................. 455/450, 423, 455/424, 452, 513, 509, 62, 9; 370/341, 329

(56) References Cited

U.S. PATENT DOCUMENTS

| | | | | |
|---|---|---|---|---|
| 3,764,915 A | * | 10/1973 | Cox et al. ..................... 455/452 |
| 5,280,630 A | * | 1/1994 | Wang .......................... 455/452 |
| 6,006,092 A | * | 12/1999 | Ward ........................... 455/421 |
| 6,088,588 A | * | 7/2000 | Osborne ....................... 455/418 |
| 6,195,554 B1 | * | 2/2001 | H'mimy et al. ............. 455/423 |
| 6,389,273 B1 | * | 5/2002 | Brandenburg ............... 455/296 |

* cited by examiner

*Primary Examiner*—Edward F. Urban
*Assistant Examiner*—S. Smith

(57) ABSTRACT

A method and system for monitoring the traffic carrier performance of a CDMA carrier in a mobile communication system are provided. The method and system assign a preferred traffic carrier to each mobile station. During a drive-test, the preferred traffic carrier is assigned to the respective mobile station either originating or receiving a call. In the event of a dropped call, the system attempts to re-establish the call on the preferred traffic carrier to provide continuous monitoring on the same traffic carrier when the call is retried. If the preferred traffic carrier is not available when the BSC or base station assigns a traffic carrier, an alternate traffic carrier can be assigned at the call setup. After the call setup procedure is completed, a handoff procedure is initiated to transfer the call from the alternate traffic carrier to the preferred traffic carrier after a predetermined time if the preferred traffic carrier is available.

13 Claims, 3 Drawing Sheets

METHOD AND SYSTEM FOR MONITORING TRAFFIC CARRIER PERFORMANCE IN A MOBILE COMMUNICATION SYSTEM

BACKGROUND OF THE INVENTION

1. Field of the Invention

The present invention generally relates to a mobile communication system, and more particularly to a method and system for monitoring the traffic carrier performance of a CDMA carrier.

2. Description of the Related Art

Drive team testing is a labor intensive process that is expensive, time consuming, and often incomplete. Drive team testing requires dispatching a mobile unit into a selected zone of coverage to make a first hand observation of system conditions. The current drive team testing methods include: Mobile Diagnostic Monitor (MDM), Mobile Station Test (MOST), and Test Carrier. Each method includes drawbacks associated with monitoring the performance of a traffic carrier during a test drive.

MDM is a software tool for collecting drive-test data with a mobile phone. The mobile station follows the standard call processing procedures. For a CDMA multi-carrier system, when a mobile station originates or receives a call, the cellular system assigns a traffic carrier on one of the equipped carriers of the sector. The assignment is based on that sector's own assignment algorithm. The traffic carrier assigned to the mobile unit can be different depending upon the prevailing system conditions (i.e., RF loading, system resources, etc.). It becomes inconvenient to monitor the performance (i.e., call drop rate, handoff completion rate, lost call, etc.) of a particular traffic carrier during a test drive as a consequence of assigning different traffic carriers to the mobile station. The method is deficient to the extent that, as a consequence of assigning different traffic carriers, there is no guarantee that all the desired performance data will be collected for the desired carrier.

In the Test Carrier method, the test mobile directs "test" mobile stations (e.g., those assigned Access Overload Class =10) to make initial system access using the carrier under test, and the normal subscriber (i.e., non-test) mobiles to make initial system access using either a carrier already in service, or any carrier assigned to the sector. This feature minimizes service provider fears about the impact of testing upon their subscriber base, by restricting subscriber mobile stations to non-test carriers, while providing full system access to test mobiles.

This feature requires the service provider to assign a test carrier to each cell on the drive test route requiring an excessively large data assignment. This occurs because each sector can have only a single carrier assigned as a test carrier. It is not practical for a technician to use different handsets to monitor the traffic carrier performance on the different carriers.

In the Mobile Station Test (MOST), technicians are permitted to use a mobile unit as a test station (i.e., a MOST mobile unit). When used as a test station, the MOST mobile unit enables the technician to test a cell-to-mobile unit call processing interface and to check the audio quality on all the carrier elements on a cell by entering the forced handoff function code to have call handoff from one carrier element to another carrier element on the cell. When monitoring the traffic performance of a specific carrier with the MDM, the technician has to repeatedly enter the forced handoff function code until the call is handed off to a traffic channel of a desired traffic carrier. When the call is dropped during the test drive and only one technician is on the test drive route, it is very inconvenient for the technician to dial a lot of numbers from the mobile station.

Accordingly, a need exists for a method and system which overcomes the disadvantages in the prior art.

SUMMARY OF THE INVENTION

The present invention provides a method and system for monitoring the traffic carrier performance of a CDMA carrier. In a first embodiment of the present invention, a desired traffic carrier (DFC) database, specific to the present invention, can be located with and controlled by each base station, base station controller (BSC), or mobile switching center (MSC) in a mobile communication system. Each DFC database includes a record for each service provider's test mobile station in the communication system. Each DFC database record includes at least two data fields: a mobile station identification field which is the record index, and a preferred traffic carrier field which identifies a preferred traffic carrier which represents the traffic carrier to be preferably selected for assignment to the mobile station involved in a call setup.

As is well known in the art, each base station operates on a subset of the radio frequency (RF) carriers assigned to the system. The preferred traffic carrier represents the RF traffic carrier to be preferably assigned to a mobile station from among the RF carriers assigned to the servicing base station.

In operation, during a call setup for a particular mobile station, where the mobile station either originates or is the recipient of a call, the servicing base station accesses the DFC database specific to the macro-cell, and uses a predefined mobile station identifier as an index into the database to retrieve the record pertaining to the particular mobile station originating/receiving the call. Once the record has been identified, the base station retrieves the preferred traffic carrier from the record, and attempts to assign the preferred traffic carrier, if available, to the mobile station to complete the call setup. If the preferred traffic carrier is available, the call can be setup by one of the following methods:

1. The system assigns the preferred traffic carrier during the call setup. In this case, the initial assigned carrier is the same as the preferred traffic carrier; or
2. The system assigns a carrier following the standard normal call setup procedure. In this case, the initial assigned carrier may be different from the preferred traffic carrier.

If the preferred traffic carrier is not available during the call setup, the method provides for one of the following alternatives:

1. Make a standard traffic carrier assignment during the call setup stage (see item 2 above).
2. Provide the mobile subscriber with a message announcement or predetermined tone indicating the call cannot be setup.

If (1) is selected, a counter will be initiated during which a continual check will be made to determine whether the preferred channel has become available. In the event the initial assigned carrier is different from the preferred traffic carrier, upon completion of a successful call setup (i.e, traffic channel acquiring procedure completes successfully), the system directs the mobile to hand off the call to the preferred traffic carrier.

Advantageously, a technician only needs to bring a single test mobile for system monitoring, that has preferred traffic carrier assigned to it. With this feature, a technician need not bring multiple handsets and make multiple call attempts to ensure that the test call is assigned on the carrier that will be monitored.

Another advantage of the present invention is that if a call is dropped or lost while being monitored during a drive test, a technician is only required to re-establish the call without being concerned about assigning a particular traffic carrier. In the event a call is dropped or lost, an attempt is made to preferably re-establish the call on the preferred traffic carrier, thereby allowing for complete and expedient testing of a coverage area than was previously possible via standard testing schemes.

A further advantage of the present invention is that the DFC database allows for effortless software upgradability and expansion of the testing system.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, where.

DETAILED DESCRIPTION OF THE PREFERRED EMBODIMENTS

Figure 1:
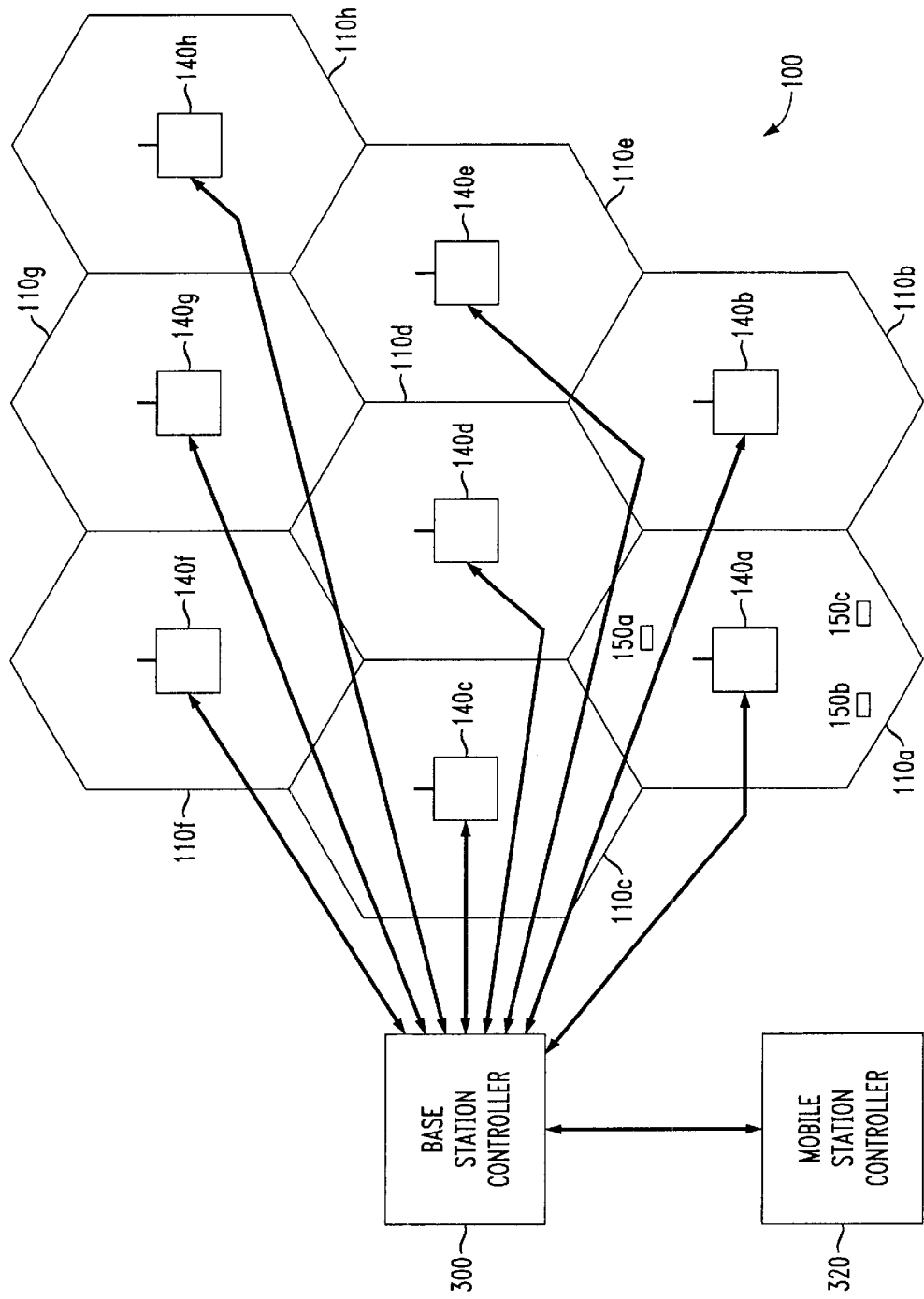
FIG. 1 is a schematic block diagram of a mobile communication system in which the present invention is implemented.
Figure 2:
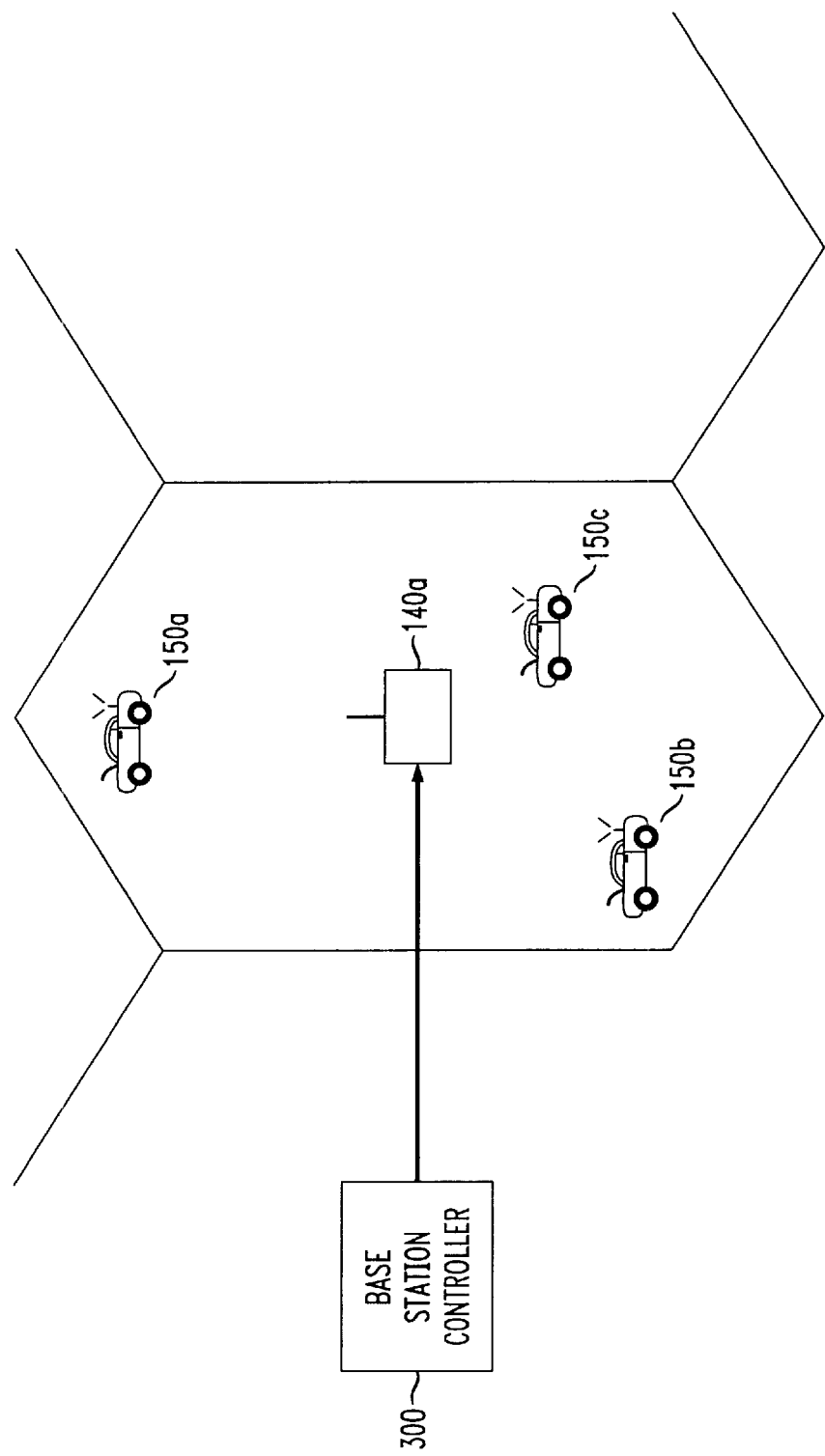
FIG. 2 is an enlarged view of a macro-cell of FIG. 1.

FIG. 1 illustrates the principal entities of a cellular telephone network 100 of which the traffic carrier database method and system of the present invention are implemented. The network 100 of FIG. 1 includes a plurality of base stations 140a–140h which provide cellular telephone service in corresponding macro-cells 110a–110h in which they are located. The base stations 140a–140h each operate on a subset of the radio frequency (RF) carriers assigned to the system. The RF carriers allocated to any given macro-cell may be reallocated to a distant macro-cell 110 in accordance with a frequency reuse pattern as is well known in the art. Each of the base stations 140a–140h are connected to the cellular telephone network 100 via a common base station controller 300. The network further includes autonomous test mobile stations 150a–150c. With reference to FIG. 2, there is shown an enlarged view of macro-cell 110a including servicing base station 140a, and mobile units 150a–150c.

In a test drive mode, a test mobile station 150a is dispatched into a selected zone of coverage (e.g., macro-cell 110a) to monitor the traffic carrier performance of a CDMA carrier in macro-cell 110a, where macro-cell 110a is serviced by base station 140a. During the test drive, a technician collects drive test data, including call processing messages and corresponding time-stamps.

To collect test drive data, the mobile station can either receive or originate a call using standard call setup procedures. Mobile station 150a originates a call (e.g., by dialing the telephone number of an ordinary subscriber and pressing the "send" button on the telephone handset in the mobile station). The dialed number and the mobile identification number/electronic serial number (MIN/ESN) pair are sent over the control channel to the base station and forwarded to the BSC 300 which validates the mobile station 150a. Then, the system will assign the call to the preferred traffic carrier in accordance with the method of the present invention as will be described below.

To receive incoming calls, the mobile station 150a continuously monitors the control channel to determine whether a page message addressed to it (i.e., a page message containing the mobile's MIN has been received. A page message will be sent to the mobile station 150a, for example, when an ordinary (landline) subscriber calls the mobile station 150a. The call is directed from the PSTN to the BSC 300 where the dialed number is analyzed. If the dialed number is validated, the BSC 300 requests some or all of the base stations 140a–140f which receive the request from the BSC 300 to transmit a page message over the control channel of the corresponding macro-cell 110 containing the MIN of the called mobile station 150a. Each of the idle mobile stations 150 present in the macro-cell 110 will compare the MIN in the page message received over the control channel with the MIN stored in the mobile station. The called mobile station 150 with the matching MIN will automatically transmit a page response over the control channel to the base station 140, the base station 140 in turn forwards the page response to the BSC 300. The system then assigns a preferred traffic carrier in accordance with the method of the present invention.

In order for the base station 140 to assign a preferred traffic carrier to a mobile station 150, in one embodiment, the base station 140 will perform a table look-up in a desired traffic carrier (DFC) database specific to the invention. In alternate embodiments, the DFC database is located with either the MSC 320 or the BSC 300. In operation, the DFC database is queried to retrieve records stored as digital data. Each record is indexed by a mobile station identifier. Once a record has been identified and retrieved by the base station, the preferred traffic carrier is extracted from the record by executing standard database software techniques. The mobile station identifier (i.e., record index) can be, for example, the mobile station's directory number, the international mobile station identification, or the electronic serial number, which is a 32 bit sub-field of the registration message. While the above mobile station identifiers comprise those most commonly used, it is contemplated that other mobile station identifier's could be used within the teachings of the present invention. The base station 140 will receive one or more of the mobile station identifiers when the mobile station 150 sends a registration message. Table 1 illustrates an example of a DFC database according to the present invention for base station 140a and mobile stations 150a–150c illustrated by FIGS. 1 and 2.

TABLE 1

| MOBILE STATION IDENTIFIER | PREFERRED CDMA TRAFFIC RF CARRIER |
|---|---|
| 82-9248-2452-6879 | F2 |
| 282-9152-9468-2251 | F1 |
| 074-9214-4452-8923 | F3 |

As shown in Table 1, each DFC database record of the DFC database includes at least two data fields: a first data field representing the mobile station identifier for mobile stations 150a–150c. The second data field represents a "preferred" CDMA traffic carrier that the system would select for assignment to each of the respective mobile stations 150a–150c. The present illustrative example assumes that base station 140a which services macro-cell 110a, has been assigned 3 RF carriers (i.e., F1, F2, F3). Referring to the first database record shown by Table 1, the mobile station identifier for mobile station 150a is 82-9248-2452-6879 and the preferred traffic carrier for mobile station 150a is RF carrier F2. That is, during a call setup, the base station 140a will preferably attempt to assign a traffic channel to mobile station 150a from among those traffic channels supported by RF carrier F2. In the event that a traffic channel supported by RF carrier F2 is not available for assignment, the present invention will assign a traffic control channel from one of the other RF carriers assigned to the macro-cell (e.g., F1 or F3) in accordance with a standard assignment protocol. In the event that the base station assigns a traffic channel other than the preferred carrier during the call setup, upon acquisition of the traffic channel, the base station will initiate a handoff procedure to direct the mobile station to handoff the call to the preferred traffic carrier using a standard channel assignment message. In this situation, the system will initiate a timer to continuously monitor the availability of the preferred traffic channel.

If a preferred traffic channel is successfully assigned to a mobile station, and the traffic carrier is inadvertently dropped during a drive test or normal operations, the system will attempt to re-assign the preferred traffic carrier to the mobile station 150a when a technician attempts to re-establish the call connection. During a test drive, a technician is no longer concerned with which carrier the mobile station will be assigned when dialing a call from a mobile station that has DFC database entries associated with it. The system removes the technician's burden by attempting to make an automatic assignment of the preferred traffic carrier.

Figure 3:
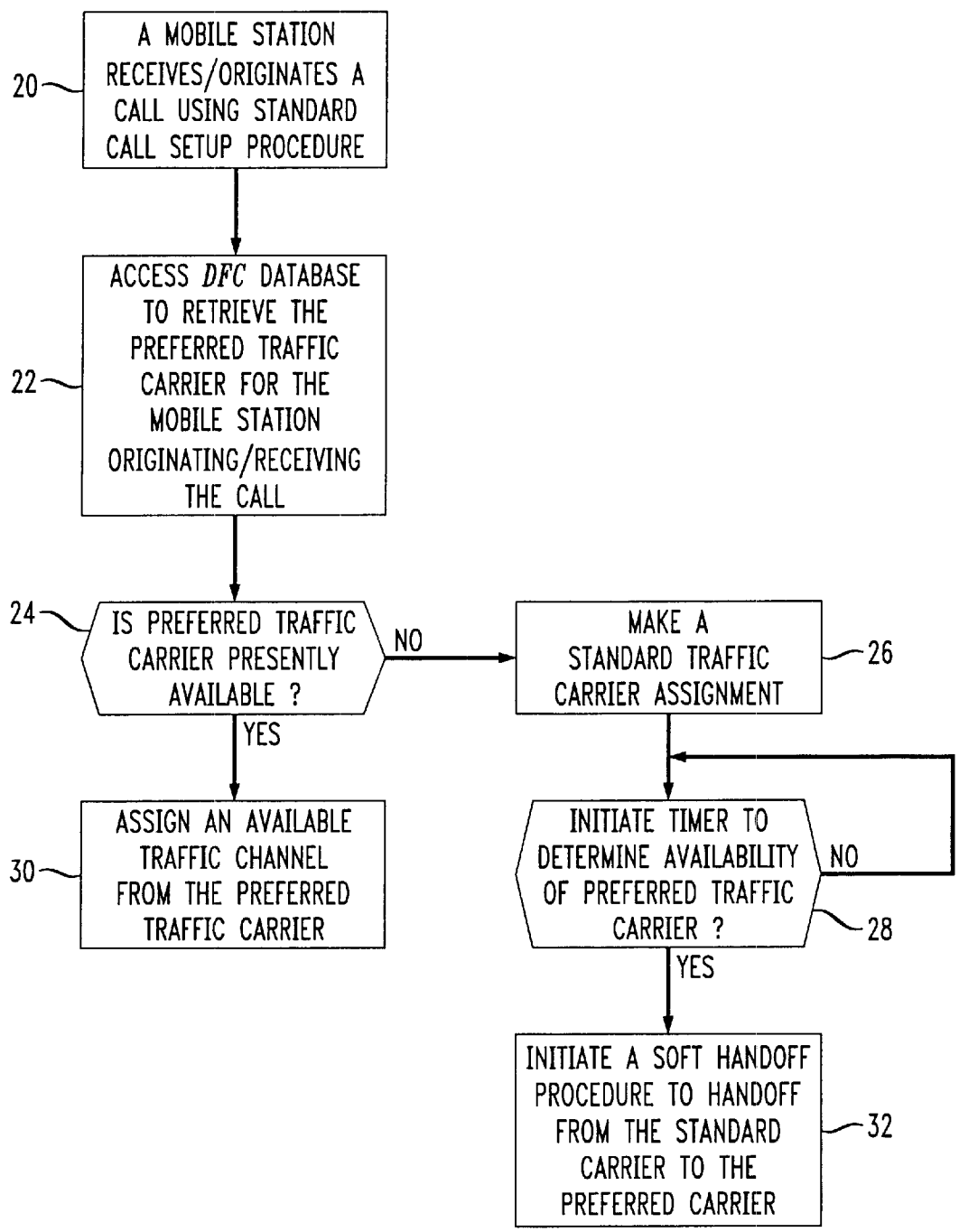
FIG. 3 is a flow chart illustrating a method for monitoring traffic carrier performance of a CDMA carrier according to the present invention.

FIG. 3 is a flow chart illustrating the method of the present invention. The flow chart assumes that a DFC database has been constructed for each respective BSC in the mobile communication system. The flow chart further assumes that the DFC database is connected with the respective BSC in the mobile communication system.

In step 20 a mobile station originates/receives a call using standard call setup procedures. In step 22, the BSC accesses the DFC database for the mobile station originating/receiving the call using the mobile station's identifier as an index into the database to find the record corresponding to the mobile station either receiving/originating the call, and selecting from that record the preferred traffic carrier. After having determined the preferred traffic carrier for the mobile station at step 22, the BSC must determine whether that preferred traffic carrier is presently available at step 24. If it is determined that the preferred traffic carrier is available, the method will assign the call to the preferred traffic carrier at step 30. However, if it is determined that the preferred traffic carrier is not available, the method will alternatively make a standard traffic carrier assignment during the call setup stage, at step 26, or alternatively reject the call by providing a tone or announcement. In the event a standard traffic carrier assignment is made at step 26, the process then determines whether the preferred traffic channel is available after a predetermined period of time at step 28. If the preferred traffic channel becomes available after a predetermined period of time, a soft handoff procedure is initiated to handoff the call from the standard carrier to the preferred carrier at step 32. However, if the preferred traffic channel is not available after the period of time, the process begins another periodic cycle and then checks, at the end of the cycle, if the preferred traffic channel is available.

It should be further noted that in the event that a completed call is dropped or lost while being monitored during a drive test, an attempt is made to preferably re-establish the call on the preferred traffic carrier.

While the invention is susceptible to various modifications and alternative forms, specific embodiments thereof have been shown by way of example in the drawings and have been described in detail. It should be understood, however, that it is not intended to limit the invention to the particular forms disclosed, but on the contrary, the intention is to cover all modifications, equivalents and alternatives falling within the spirit and scope of the invention as defined by the appended claims.

What is claimed is:

1. A method for monitoring traffic carrier performance during a drive test of a mobile communication system having a plurality of base stations each transmitting signals to and receiving signals from a plurality of mobile units including a mobile test unit, said signals being carried over a plurality of traffic carriers, said method comprising the steps of:

designating a preferred traffic carrier for the drive test and identifying the preferred traffic carrier with a preferred traffic carrier identifier;

creating a desired traffic carrier (DFC) database that assigns the preferred traffic carrier identifier to the mobile test unit, wherein the DFC database includes a preferred traffic carrier field identifying the preferred traffic carrier and an index field identifying each of said plurality of mobile units for performing call setup with each of said plurality of mobile units;

performing a call setup for the mobile test unit by accessing the DFC database and retrieving the preferred traffic carrier identifier assigned to the mobile test unit;

determining if the preferred traffic carrier is available for assignment; and assigning the preferred traffic carrier to the mobile test unit if the preferred traffic carrier is determined to be available for assignment.

2. The method of claim 1, wherein the preferred traffic carrier is retrieved from a subset of radio frequency (RF) carriers assigned to said base station.

3. The method of claim 1, wherein said call setup is one of originating and receiving a call.

4. The method of claim 1, wherein the DFC database is located at a mobile switching center servicing said mobile communication system.

5. The method of claim 1, wherein the DFC database is located at each of said plurality of base stations.

6. The method of claim 1, wherein the DFC database includes multiple records where each record corresponds to one of said plurality of mobile stations and each of said row entries includes a first data field for identifying said one of said plurality of mobile stations, and a second data field for identifying a preferred traffic carrier.

7. The method of claim 1, wherein if said determining step determines that said identified preferred traffic carrier is not available, the method further comprises the step of assigning an alternate traffic carrier to said one of said plurality of mobile stations.

8. The method of claim 7, further comprising the step of initiating a handoff procedure upon assigning said alternate traffic carrier to said one of said plurality of mobile stations to handoff said one of said plurality of mobile stations from said alternate traffic carrier to said preferred traffic carrier.

9. The method of claim 1, wherein said step of assigning said preferred traffic carrier entails assigning said one of said plurality of mobile stations via a standard channel assignment message.

10. A mobile communication system for monitoring traffic carrier performance of a CDMA carrier during a drive test, said system comprising:

a plurality of mobile units including a mobile test unit;

a plurality of base stations each transmitting signals to and receiving signals from the plurality of mobile units and the mobile test unit, said signals being carried over a plurality of traffic carriers; and at least one desired traffic carrier (DFC) database, said database including a preferred traffic carrier identifier corresponding to a preferred traffic carrier and an index field identifying each of said plurality of mobile units for performing call setup with each of said plurality of mobile units, wherein a call setup for the mobile test unit accesses the DFC database, retrieves the preferred traffic carrier identifier assigned to the mobile test unit for the drive test, and assigns the preferred traffic carrier to the mobile test unit if the preferred traffic carrier is determined to be available for assignment.

11. The system of claim 10, wherein each of said plurality of base stations includes means for accessing one of said at least one DFC database.

12. The system of claim 10, further comprising a base station controller (BSC) servicing said plurality of base stations, said BSC having means for accessing said at least one DFC database.

13. The system of claim 10, further comprising a mobile switching center (MSC) servicing said plurality of base stations, said MSC having means for accessing said at least one DFC database.

* * * * *